US008927683B2

(12) United States Patent
Atobe et al.

(10) Patent No.: US 8,927,683 B2
(45) Date of Patent: Jan. 6, 2015

(54) POLYMERIZATION FLUID, METHOD FOR PRODUCING THE POLYMERIZATION FLUID, TRANSPARENT FILM AND TRANSPARENT ELECTRODE MADE FROM THE POLYMERIZATION FLUID

(75) Inventors: Mahito Atobe, Yokohama (JP); Koji Nakabayashi, Yokohama (JP); Kenji Machida, Tokyo (JP); Sekihiro Takeda, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 13/582,282

(22) PCT Filed: Mar. 1, 2011

(86) PCT No.: PCT/JP2011/001182
§ 371 (c)(1),
(2), (4) Date: Oct. 31, 2012

(87) PCT Pub. No.: WO2011/108254
PCT Pub. Date: Sep. 9, 2011

(65) Prior Publication Data
US 2013/0037411 A1    Feb. 14, 2013

(30) Foreign Application Priority Data
Mar. 1, 2010    (JP) .................................. 2010-044800

(51) Int. Cl.
*C08G 75/00* (2006.01)
*H01G 9/028* (2006.01)
(Continued)

(52) U.S. Cl.
CPC .............. *H01G 9/028* (2013.01); *C08G 61/126* (2013.01); *H01B 1/127* (2013.01);
(Continued)

(58) Field of Classification Search
CPC .................. C08G 2261/3223; C08G 2261/44;
C08G 61/126; H01G 9/028; H05B 33/28

USPC ................................... 528/377, 378, 370, 380
See application file for complete search history.

(56) References Cited

U.S. PATENT DOCUMENTS

2006/0076557 A1    4/2006    Waller et al.
2006/0236531 A1    10/2006   Merker et al.
2010/0019228 A1    1/2010    Jiang et al.

FOREIGN PATENT DOCUMENTS

JP    61-209225 A    9/1986
(Continued)

OTHER PUBLICATIONS

Abstracts of the Symposium of the Japan Society for Analytical Chemistry, 2008, p. 222, vol. 69th.
(Continued)

*Primary Examiner* — Shane Fang
(74) *Attorney, Agent, or Firm* — Birch, Stewart, Kolasch & Birch, LLP

(57) ABSTRACT

Disclosed is a polymerization fluid for electropolymerization which exhibits a reduced environmental burden and excellent economic efficiency and which can yield a conductive polymer film that has high conductivity and that is dense and highly transparent. The polymerization fluid includes at least one monomer selected from the group consisting of 3,4-disubstituted thiophenes which is dispersed as oil drops in surfactant-free water, and the polymerization fluid is transparent. The polymerization fluid can be produced by a method which includes: an addition step of adding the monomer to surfactant-free water to prepare a phase separation fluid where water and the monomer are phase-separated; a first dispersion step of irradiating the phase separation fluid with ultrasonic waves to make the monomer dispersed in the form of oil drops and thus prepare an opaque dispersion, and a second dispersion step of irradiating the opaque dispersion with ultrasonic waves having a frequency higher than that of the ultrasonic waves used in the first dispersion step to reduce the mean size of the oil drops of the monomer and thus prepare a transparent dispersion.

11 Claims, 7 Drawing Sheets

(51) Int. Cl.
*C08G 61/12* (2006.01)
*H01B 1/12* (2006.01)
*H05B 33/28* (2006.01)
*H01G 11/56* (2013.01)

(52) U.S. Cl.
CPC ............... *H05B 33/28* (2013.01); *H01G 11/56* (2013.01); *C08G 2261/1424* (2013.01); *C08G 2261/3223* (2013.01); *C08G 2261/44* (2013.01); *Y02E 60/13* (2013.01)
USPC ............ 528/377; 528/378; 528/380; 528/370

(56) References Cited

FOREIGN PATENT DOCUMENTS

| | | |
|---|---|---|
| JP | 1-313521 A | 12/1989 |
| JP | 10-289839 A | 10/1998 |
| JP | 2000-269087 A | 9/2000 |
| JP | 2005-330457 A | 12/2005 |
| JP | 2006-152251 A | 6/2006 |
| JP | 2006-295184 A | 10/2006 |
| JP | 2007-297500 A | 11/2007 |

OTHER PUBLICATIONS

Asami, R. et al., "Development of a Novel Environmentally Friendly Electropolymerization of Water-Insoluble Monomers in Aqueous Electrolytes Using Acoustic Emulsification", Langmuir, Oct. 6, 2006, pp. 10258-10263, vol. 22, No. 24.

Asami, R. et al., "Electropolymerization of an Immiscible Monomer in Aqueous Electrolytes Using Acoustic Emulsification", J. Am. Chem. Soc., 2005, pp. 13160-13161, vol. 127, No. 38.

Atobe, M. et al., "Electrochemical Reaction of Water-Insoluble Organic Droplets in Aqueous Electrolytes Using Acoustic Emulsification", Langmuir, Feb. 17, 2010, pp. 9111-9115, vol. 26, No. 11.

International Search Report issued in PCT/JP2011/001182 mailed May 31, 2011.

Nakabayashi, K. et al., "Transparentization of emulsified aqueous solution containing water-insoluble organic droplets using tandem acoustic emulsification and its application to electropolymerization", Abstracts of Autumn Meeting of the Electrochemical Society of Japan, Sep. 2, 2010, p. 15, vol. 2010.

Sakmeche, N. et al., "Improvement of the Electrosynthesis and Physicochemical Properties of Pol(3,4-ethylenedioxythiophene) Using a Sodium Dodecyl Sulfate Micellar Aqueous Medium", Langmuir, 1999, pp. 2566-2574, vol. 15, No. 7.

Tamburri, E. et al., "Growth mechanisms, morphology, and electroactivity of PEDOT layers produced by electrochemical routes in aqueous medium", Synthetic Metals, 2008, pp. 1-9, doi:10.1016/j.synthmet.2008.10.014.

a)

b)

a)

b)

a)

b)

(A)　　　　　　　　　　(B)

(A)　　　　　　　　　　(B)

POLYMERIZATION FLUID, METHOD FOR PRODUCING THE POLYMERIZATION FLUID, TRANSPARENT FILM AND TRANSPARENT ELECTRODE MADE FROM THE POLYMERIZATION FLUID

BACKGROUND OF THE INVENTION

1. Field of the Invention

The present invention relates to a polymerization fluid with a small environmental burden to be used for electropolymerization of a 3,4-disubstituted thiophene (hereinafter referred to as "substituted thiophene"), and a production method thereof. The present invention also relates to a conductive polymer film with high conductivity and transparency and a transparent electrode with the conductive polymer film, which are obtained from the polymerization fluid.

2. Description of the Related Art

Polymers of a substituted thiophene are conventionally known, and have been applied in various fields such as a solid electrolytic capacitor, a polymer battery, an antistatic film, an indicating element, a sensor, and an electrode material. Particularly, poly(3,4-ethylenedioxythiophene) (hereinafter, 3,4-ethylenedioxythiophene is referred to as "EDOT" and poly(3,4-ethylenedioxythiophene) is referred to as "PEDOT") is suitable for various electrical and optical purposes because it has a low energy band gap, very high conductivity and environmental stability, and excels in permeability in relation to visible light (transparency). These conductive polymers are obtained by chemical polymerization or electropolymerization (for example, see patent literature 1 (JP 1-313521 A)). When electropolymerization is implemented, a film-shaped conductive polymer with high conductivity is formed on an electrode from a small amount of substituted thiophene in a short period of time.

The electropolymerization of substituted thiophene is usually performed with a polymerization fluid containing an organic solvent such as acetonitrile and isopropyl alcohol, because the solubility of substituted thiophene in water is remarkably low. For example, in Examples 9-14, 18-22 of the patent literature 1, a polymerization fluid containing acetonitrile as a solvent and EDOT as a monomer is used to obtain a film with conductivity of approximately 200 S/cm. An organic solvent such as acetonitrile dissolves an oligomer produced in the process of polymerization to make it a high-molecular-weight polymer, and produces a conductive polymer film having high conductivity. However, there have been cases where the conductive polymer film produced was dissolved in the organic solvent, the density of the film was lowered, the smoothness of the film surface was lost, and the transparency of the film was decreased. Further, the use of an organic solvent generally increases an environmental burden and is economically disadvantageous compared with the use of a water solvent. Furthermore, many organic solvents are harmful to the human body, and in the case of electropolymerization using a combustible solvent, preventive measures need to be taken to avert the risk of fire due to electric sparks.

Therefore, consideration has been given to the use of water as a solvent of a polymerization fluid, which is inactive against the conductive polymer film produced, has a small environmental burden, and is economically efficient. The following two methods have been proposed so far—a method to add an anionic surfactant with a long-chain alkyl group such as sodium dodecyl sulfate or sodium dodecylbenzenesulfonate or a polymerization-type anionic surfactant such as sodium polystyrene sulfonate to a mixture of substituted thiophene and water so that the substituted thiophene is solubilized or emulsified, and a method to irradiate ultrasonic waves through a mixture of substituted thiophene and water and disperse oil drops of substituted thiophene into water.

For example, non-patent literature 1 (Langmuir, 1999, 15(7), 2566-2574) describes electropolymerization using a water solution in which EDOT, $LiClO_4$ as a supporting electrolyte, and sodium dodecyl sulfate as an anionic surfactant are dissolved. By the action of sodium dodecyl sulfate, the solubility of EDOT in water is increased, the oxidation potential of EDOT is lowered, and a film with an excellent adherence property and a regularly-arranged structure is produced on a Pt electrode. Patent literature 2 (JP 2000-269087 A) describes electropolymerization using a polymerization fluid in the form of aqueous medium produced by emulsifying a thiophene derivative such as EDOT with an alkylnaphthalenesulfonate surfactant. The alkylnaphthalenesulfonate anion taken into the polymer layer as a dopant is so bulky that de-doping is inhibited, and a conductive polymer layer that is stable at high temperature and high humidity is obtained.

Non-patent literature 2 (Synthetic Met., 2009, 159(5-6), 406-414) describes electropolymerization using an aqueous solution in which EDOT and sodium polystyrene sulfonate as an anionic surfactant are dissolved. By the action of sodium polystyrene sulfonate, the solubility of EDOT in water is increased, EDOT becomes more easily oxidizable, and a uniform film is formed on a Pt electrode. Patent literature 3 (JP 2006-295184 A) describes a method for producing a conductive polymer layer using a dispersion prepared by adding EDOT, iron (III) sulfate, and sodium persulfate to an aqueous solution containing polystyrene sulfonic acid, forming PEDOT/polystyrene sulfonate particles in the aqueous solution by the reaction between them, and adding a binding agent to it.

Furthermore, non-patent literature 3 (J. AM. CHEM. SOC. (2005), 127(38), 13160-13161) describes results of electropolymerization using an opaque polymerization fluid in which narrowly-distributed EDOT oil drops with an average diameter of 211 nm are dispersed in water. The polymerization fluid is prepared by adding an amount of EDOT larger than saturated solubility to an aqueous solution in which $LiClO_4$ as a supporting electrolyte is dissolved, and irradiating ultrasonic waves at a frequency of 20 kHz with power of 22.6 W/cm$^2$ for 60 seconds (see FIG. 1 in this literature). By direct charge transfer between a Pt electrode and the EDOT oil drops, a PEDOT film having conductivity of approximately 30 S/cm is formed on the PT electrode.

BRIEF SUMMARY OF THE INVENTION

1. Problems to be Solved by the Invention

However, the conductivity of the conductive polymer films made from the polymerization fluid including the anionic surfactants with a long-chain alkyl group or the polymerized anionic surfactants used in the non-patent documents 1 and 2 and the patent documents 2 and 3 are not generally satisfactory. Further, the usage of a surfactant is economically disadvantageous, increases an environmental burden, and requires a cumbersome and complicated process to separate the anionic surfactant when the polymerization fluid is disposed of. On the other hand, the method that utilizes the ultrasonic irradiation in the non-patent literature 3 is advantageous in that its environmental burden is small and the process of waste disposal is simplified, but the conductivity of the PEDOT film obtained is about one digit smaller than that of a conventional PEDOT film obtained by electropolymerization using a polymerization fluid containing an organic solvent such as acetonitrile. Moreover, there are no findings about the density or transparency of the conductive polymer film obtained through these conventional arts.

It is therefore an object of the present invention to provide a polymerization fluid for electropolymerization of substituted thiophene that has a small environmental burden and is efficient economically and which can yield a conductive polymer film that has high conductivity and that is dense and highly transparent. Another object of the present invention is to provide a conductive polymer film obtained from the polymerization fluid, which has high conductivity and is dense and highly transparent, as well as to provide a transparent electrode containing the film.

2. Means for Solving Problems

The inventors thoroughly investigated the method in the non-patent literature 3 that utilized ultrasonic irradiation and found that, by irradiating ultrasonic waves into a solution obtained by adding a substituted thiophene more than the amount of saturated solubility to surfactant-free water for the purpose of preparing an opaque dispersion in which the substituted thiophene is dispersed as oil drops in water, and by successive irradiating an ultrasonic wave at higher frequency into the opaque dispersion, the size (diameter) of oil drops in the substituted thiophene can be easily decreased and a transparent dispersion, the entirety of which seems to be transparent, can easily be obtained. The inventors also found that, by implementing electropolymerization by using the transparent dispersion as a polymerization fluid, the electropolymerization smoothly proceeds by direct charge transfer between the minute oil drops of substituted thiophene in the transparent dispersion and the working electrode of electrolytic polymerization, and a conductive polymer film which has high conductivity and is dense and highly transparent can be obtained.

Therefore, the present invention relates to a polymerization fluid for electropolymerization of at least one monomer selected from the group consisting of 3,4-disubstituted thiophenes, wherein the monomer is dispersed as oil drops in surfactant-free water, and wherein the polymerization fluid is transparent. As far as the present invention is concerned, a "transparent polymerization fluid" means a polymerization fluid with 90% or more of the total number of oil drops of the substituted thiophene dispersed in the polymerization fluid having a diameter of 250 nm or less. Such minute oil drops of the substituted thiophene exist in a highly-dispersed state in the polymerization fluid of the present invention. Light scatter due to the oil drops is not practically observed, and the entire polymerization fluid looks transparent. It is also worth noting that the size of the oil drops can be observed by a dynamic light scattering method.

Moreover, as far as the present invention is concerned, a "surfactant" means a substance that has an effect of solubilization or emulsification of substituted thiophene in water. In the case a solution containing water, a substituted thiophene and a chemical compound X is mechanically agitated, and after the agitation is stopped, the substituted thiophene and water quickly phase-separate, the compound X is not included in the "surfactant". In the present invention, therefore, a compound that does not fall under the category of a general surfactant does not naturally fall under the category of the "surfactant" in the present invention, but even if a compound does fall under the category of a general surfactant, when a surface-active mechanism is not found practically because it only exists in the polymerization fluid in minute amounts and the substituted thiophene and water are quickly separated from each other after the agitation is stopped, this minute amount of compound is not included in the "surfactant" in the present invention either. Furthermore, as far as the present invention is concerned, an "ultrasonic wave" means a sonic wave at a frequency of 10 KHz or more.

The polymerization fluid of the present invention is extremely stable because the agglomeration of the minute oil drops of the substituted thiophene dispersed in the transparent polymerization fluid is remarkably slow. When electropolymerization is carried out by using this polymerization fluid, the charge-transfer between the minute oil drops of the substituted thiophene and a working electrode for the electropolymerization such as Pt electrode smoothly proceeds, and a highly transparent and highly conductive polymer film with polymer particles that are nearly as large as the minute oil drops and therefore look transparent and that are densely agglomerated, is obtained. Even if this film is subjected to a high temperature, a high degree of conductivity will be preserved. The smaller the size of the oil drops of the substituted thiophene in the polymerization fluid, the more the density, conductivity and transparency of a conductive polymer film are improved. Especially, if 80% or more of the total number of the oil drops in the substituted thiophene dispersed in the polymerization fluid have a diameter of 100 nm or less, the conductivity of a conductive polymer film will be remarkably increased and the transparency of the film will be remarkable.

In the polymerization fluid of this invention, a substituted thiophene, that is, a compound selected from a group consisting of 3,4-disubstituted thiophenes, can be used as a monomer without restriction. The substituents at the 3- and 4-positions of a thiophene ring can form the ring with carbons at the 3- and 4-positions. Especially, it is preferable that the monomer is EDOT, because a conductive polymer film which has excellent permeability in relation to visible light (transparency) and has high conductivity and high electrochemical capacity.

In the polymerization fluid of the present invention, at least one supporting electrolyte is generally comprised in addition to water as a solvent and a substituted thiophene. However, in the case where electropolymerization is performed in a condition under which the interval between a working electrode used for electropolymerization and an antipole approximates to around 100 μm or less, where mutual diffused layers overlap each other, a supporting electrolyte does not need to be included in the polymerization fluid.

In the present invention, a supporting electrolyte that does not act as a surfactant can be used. It is preferable that the supporting electrolyte is an oil-soluble electrolyte that can be dissolved into the oil drops of substituted thiophene, because the polymerization accelerates. Especially, at least one compound selected from a group consisting of borodisalicylic acid, borodisalicylic salts, a sulfonylimidic acid of the formula (I) or the formula (II)

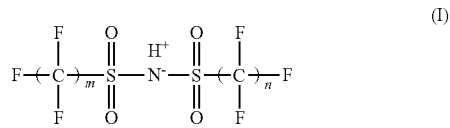

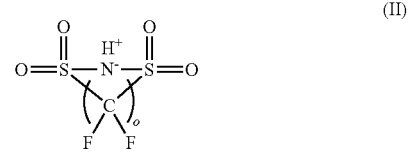

where m is an integer from 1 to 4, preferably 2, n is an integer from 1 to 4, preferably 2, and o is an integer 2 or 3, and salts thereof, is preferably used as the supporting electrolyte, because the thermal resistance property of a conductive polymer film obtained from electropolymerization is improved. However, it is known that a borodisalicylic acid ion contained in borodisalicylic acid, and borodisalicylic salts is hydrolyzed in water into salicylic acid and boric acid, which have extremely low solubility in water. Therefore, when borodisalicylic acid and/or a borodisalicylic salt are used as a supporting electrolyte, a precipitate is gradually produced in the polymerization fluid and the polymerization fluid becomes unusable. To avoid this, in the cases where borodisalicylic acid and/or a borodisalicylic salt are used as a supporting electrolyte, the electropolymerization should be carried after this supporting electrolyte is added to the solution before precipitate formation, or p-nitrophenol should be combined. The polymerization fluid containing p-nitrophenol and a borodisalicylic acid ion does not produce a precipitate, probably because p-nitrophenol inhibits the hydrolysis of a borodisalicylic acid ion.

As mentioned above, the polymerization fluid of the present invention is preferably obtained by irradiating ultrasonic waves at different frequencies into a solution containing water and substituted thiophene. Therefore, the present invention also relates to a method for producing a polymerization fluid of the invention, comprising: an addition step of adding the monomer to surfactant-free water to prepare a phase separation fluid where water and the monomer are phase-separated; a first dispersion step of irradiating the phase separation fluid with ultrasonic waves to make the monomer dispersed in the form of oil drops and thus prepare an opaque dispersion, and a second dispersion step of irradiating the opaque dispersion with ultrasonic waves having a frequency higher than that of the ultrasonic waves used in the first dispersion step to reduce the mean size of the oil drops of the monomer and thus prepare a transparent dispersion.

In the case where the polymerization fluid comprising a supporting electrolyte is obtained, the addition of the supporting electrolyte is implemented, either before the first dispersion step, between the first dispersion step and the second dispersion step, or after the second dispersion step. In the case where borodisalicylic acid and/or a borodisalicylic salt are used as the supporting electrolyte, they are added to the fluid after the second dispersion step, preferably just before electropolymerization, or are used together with p-nitrophenol. When borodisalicylic acid and/or a borodisalicylic salt are used together with p-nitrophenol, borodisalicylic acid and/or a borodisalicylic salt can be added before the first dispersion step or between the first dispersion step and the second dispersion step, but p-nitrophenol is added at around the same time as the addition of borodisalicylic acid and/or a borodisalicylic salt, or p-nitrophenol is added before borodisalicylic acid and/or a borodisalicylic salt.

The first dispersion step is preferably implemented by using ultrasonic waves at a frequency of 15 to 200 kHz on relatively high power, preferably with power of 4 W/cm$^2$ or more, and the second dispersion step is preferably implemented by using ultrasonic waves at a frequency of 1 to 4 MHz on relatively high power, preferably with power of 5 W/cm$^2$ or more. If the frequency of the ultrasonic waves in the first dispersion step is less than 15 kHz or exceeds 200 kHz, or when the power of the ultrasonic waves in the first dispersion step is less than 4 W/cm$^2$, the cavitations that are preferable to obtain the opaque dispersion become less likely to be produced. Moreover, when the frequency of the ultrasonic waves in the second dispersion step is less than 1 MHz or exceeds 4 MHz, or when the power of the ultrasonic waves in the second dispersion step is less than 5 W/cm$^2$, the cavitations preferable to decrease the mean size of oil drops of substituted thiophene in the first dispersion step until the transparent dispersion is obtained will be less likely to be produced.

In the method for producing a polymerization fluid of the present invention, the first dispersion step and the second dispersion step can be implemented one time each (for example, using ultrasonic waves at a frequency of 20 kHz with power of 10 W/cm$^2$ in the first dispersion step and ultrasonic waves at a frequency of 1 MHz with power of 20 W/cm$^2$ in the second dispersion step), but it is also possible to implement the first dispersion step more than once using ultrasonic waves at different frequencies and/or different powers (for example, using ultrasonic waves at a frequency of 20 kHz and with power of 10 W/cm$^2$ followed by ultrasonic waves at a frequency of 50 kHz and with power of 20 W/cm$^2$), and/or, the second dispersion step can be implemented more than once by using ultrasonic waves at different frequencies and/or power (for example, using ultrasonic waves at a frequency of 1 MHz and with power of 20 W/cm$^2$ followed by ultrasonic waves at a frequency of 2 MHz and 10 W/cm$^2$). Especially, it is preferable to implement the second dispersion step more than once under the condition that the frequency of ultrasonic waves increases as the number of times the step is run increases. By repeating the second dispersion step more than once, the oil drops of substituted thiophene becomes further segmentalized and the polymerization fluid is easily obtained which is particularly preferable because more than 80% of the total number of oil drops in the substituted thiophene have a diameter of 100 nm or less. Furthermore, the conductivity and transparency of the conductive polymer film obtained by the electropolymerization using this polymerization fluid further increase.

The opaque dispersion or the transparent dispersion is obtained even if the ultrasonic irradiation period of each dispersion step is approximately 1 minute. However, it is preferable that the irradiation period is prolonged, because the aggregation of the oil drops of substituted thiophene is inhibited and the time period until demulsification is prolonged. The ultrasonic irradiation period in the first dispersion step is preferably within the range of 2 to 10 minutes, and the ultrasonic irradiation period in the second dispersion step is also preferably between 2 to 10 minutes. If the ultrasonic irradiation period is 10 minutes or more, the effect on the inhibition of the aggregation of oil drops tends to be saturated.

The polymerization fluid of the present invention gives a more transparent conductive polymer film compared with a conventional conductive polymer film obtained from substituted thiophene. Therefore, the present invention also relates to a transparent film comprising a conductive polymer, preferably PEDOT, which is obtained by introducing a substrate with a conductive part at least on the surface into the polymerization fluid of the present invention and implementing electropolymerization. By using a transparent substrate with a conductive part at least on the surface, and introducing the transparent substrate into the polymerization fluid of the present invention and implementing electropolymerization, a transparent electrode comprising the transparent substrate with a conductive part and a transparent film with a conductive polymer, preferably PEDOT, layered on the conductive part of the transparent substrate, is provided. The transparent electrode has high conductivity, is highly transparent, and has excellent environmental stability.

3. Advantageous Effects of the Invention

The polymerization fluid for electropolymerization of substituted thiophene in the present invention has a small environmental burden and is economically efficient, because it uses water as a solvent and does not use a surfactant. Moreover, the conductive polymer film obtained from the polymerization fluid of the present invention is denser and more highly conductive compared with a conventional conductive polymer film obtained from a polymerization fluid in which the solvent is water, and the high conductivity of the conductive polymer film of the present invention is maintained after the polymer film experiences a high temperature. Moreover, the conductive polymer film obtained from the polymerization fluid of the present invention has remarkably high transparency.

DETAILED DESCRIPTION OF THE INVENTION

Figure 1:
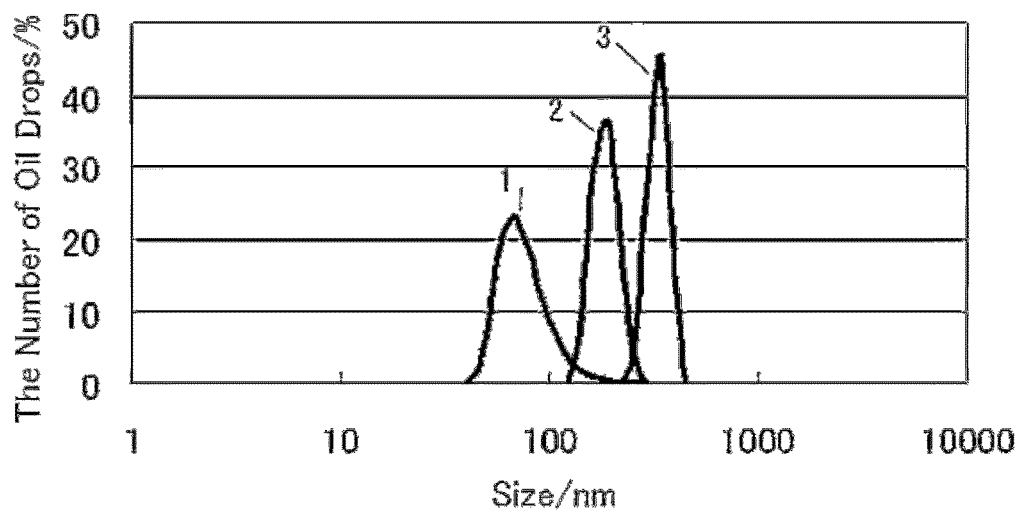
FIG. 1 shows the measured results of the size of EDOT oil drops in polymerization fluids.

A polymerization fluid for electropolymerization of substituted thiophene in the present invention is characterized by the fact that it contains, as essential components, water as a solvent and a substituted thiophene dispersed as oil drops in water, and it does not contain a surfactant to make the substituted thiophene solubilized or emulsified in water. The polymerization fluid of the present invention is preferably produced by the following steps: an addition step of adding the substituted thiophene to surfactant-free water to prepare a phase separation fluid where water and the monomer are phase-separated; a first dispersion step of irradiating the phase separation fluid with ultrasonic waves to prepare an opaque dispersion, and a second dispersion step of irradiating the opaque dispersion with ultrasonic waves having a frequency higher than that of the ultrasonic waves used in the first dispersion step to prepare a transparent dispersion. In an electropolymerization step to implement electropolymerization by introducing a working electrode and an antipole to the polymerization fluid, a conductive polymer film with high conductivity and high transparency can be obtained. Details of each step are explained in the following.

(1) Addition Step

For the polymerization fluid of the present invention, water, which has little environmental burden and is economically efficient, is used as a solvent, and as a monomer, a poorly water-soluble substituted thiophene, that is, a monomer selected from the group of 3,4-disubstituted thiophenes, is used. The substituents at the 3- and 4-positions of the thiophene ring can form a ring together with carbons at the 3- and 4-positions. Examples of usable monomers are: 3,4-dialkoxythiophenes such as 3,4-dimethoxythiophene and 3,4-diethoxythiophene, alkylenedioxythiophenes such as 3,4-methylenedioxythiophene, EDOT and 3,4-(1,2-propylenedioxy)thiophene, alkyleneoxythiathiophenes such as 3,4-methyleneoxythiathiophene, 3,4-ethyleneoxythiathiophene and 3,4-(1,2-propyleneoxythia)thiophene, alkylenedithiathiophenes such as 3,4-methylenedithiathiophene, 3,4-ethylenedithiathiophene and 3,4-(1,2-propylenedithia)thiophene, alkylthieno[3,4-b]thiophenes such as thieno[3,4-b]thiophene, isopropylthieno[3,4-b]thiophene and t-butylthieno[3,4-b]thiophene. For the monomer, a single compound can be used, and a mixture of more than one compound can be used. Especially, it is preferable to use EDOT.

In the addition step, as well as adding a substituted thiophene to water, a supporting electrolyte can be added as required. When electropolymerization is implemented under the condition that the interval between the working electrode and the antipole approximates to around 100 μm or less, where mutual diffused layers overlap each other, the supporting electrolyte does not need to be included in the polymerization fluid.

In the present invention, a supporting electrolyte that does not act as a surfactant can be used. Examples of usable supporting electrolytes are: For example, inorganic acids such as hydrochloric acid, perchloric acid, boric acid, nitric acid and phosphoric acid, and organic acids such as acetic acid, oxalic acid, citric acid, ascot acid, tartaric acid, squaric acid, rhodizonic acid, croconic acid, salicylic acid, p-toluenesulfonic acid, 1,2-dihydroxy-3,5-benzenedisulfonic acid, methanesulfonic acid, trifluoromethanesulfonic acid, borodisalicylic acid, bis(oxalato)borate acid, a sulfonylimidic acid of the formula (I) or the formula (II)

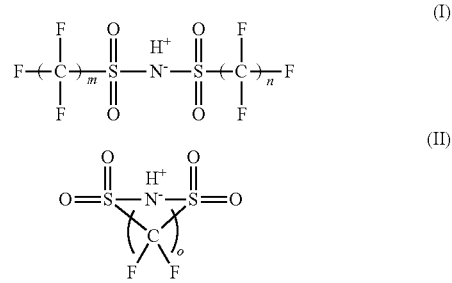

where m is an integer from 1 to 4, n is an integer from 1 to 4, and o is an integer 2 or 3, and salts thereof. Examples of the salts are: an alkali metal salt such as a lithium salt, a sodium salt and a potassium salt, an ammonium salt, an alkylammonium salt such as an ethylammonium salt and a butylammonium salt, a dialkylammonium salt such as a diethylammonium salt and a dibutylammonium salt, a trialkylammonium salt such as a triethylammonium salt and a tributylammonium salt, and a tetraalkylammonium salt such as a tetraethylammonium salt and a tetrabutylammonium salt. However, when borodisalicylic acid and/or a borodisalicylic salt are used in this step, they are used together with p-nitrophenol.

For the supporting electrolyte, a single compound can be used, and a mixture of more than one compound can be used. The supporting electrolyte with oil solubility that can be dissolved in the oil drops of substituted thiophene dispersed in water is preferable, because it accelerates polymerization. Lithium perchlorate, tetraethylammonium perchlorate, sodium p-toluenesulfonate, borodisalicylic acid and salts thereof, and a sulfonylimidic acid of the formula (I) or the formula (II) and salts thereof, is preferably used. Borodisalicylic acid and salts thereof, and a sulfonylimidic acid of the formula (I) or the formula (II) and salts thereof, are especially preferable because they give a heat-resistant conductive polymer film. The salts of bis(pentafluoroethanesulfonyl)imidic acid, for example, a potassium salt, a sodium salt, and an ammonium salt are particularly preferable.

The substituted thiophene as a monomer is used in the polymerization fluid in an amount that is more than that required for saturated solubility. Therefore, the substituted thiophene in more than the saturated amount separates in a static state from water. The amount of the substituted thiophene that exceeds the saturated amount of dissolution is acceptable if it is an amount where demulsification is inhibited after ultrasonic irradiation and a transparent dispersion is obtained, and this amount varies by not only the type of the monomer, but by the type and quantity of the supporting electrolyte and the conditions of ultrasonic irradiation. When EDOT is used as the monomer, it is generally preferable to add to water 20-30 mmol of EDOT per liter of water.

The supporting electrolyte is used, depending on the type of the supporting electrolyte, in an amount of saturated solubility or less in the polymerization fluid and in a concentration where a sufficient current for electropolymerization is obtained, preferably in a concentration of 10 mmol or more per liter of water. If the concentration of the supporting electrolyte is too high, it becomes more difficult for the substituted thiophene to be dispersed as the oil drops, and it becomes more difficult for a transparent dispersion to be obtained. The supporting electrolyte can be added in this addition step, but not being limited to this, it can be added between the first dispersion step and the second dispersion step or after the second dispersion step, as described below.

The phase separation fluid that contains water, the substituted thiophene, and as the case may be, the supporting electrolyte, and in which water and the substituted thiophene is phase-separated, then goes through the ultrasonic process. In the polymerization fluid of the present invention, a surfactant, which increases an environmental burden and is economically disadvantageous, is not used to make the substituted thiophene solubilized or emulsified in water.

The polymerization fluid for electropolymerization of substituted thiophene in the present invention is characterized by the fact that it is a transparent polymerization fluid where the substituted thiophene is dispersed as oil drops in water, that is, 90% or more of the total number of the oil drops have a diameter of 250 nm or less. In order to obtain such minute oil drops by ultrasonic irradiation, at least the same size, or preferably the size of 100 nm or less, of cavitations needs to be produced. However, the cavitations with the size of 100 nm or less are too small in size and have too weak in mechanical action to disperse the phase separated thiophene evenly, so practically they do not have the capability to disperse the substituted thiophene. Therefore, the polymerization fluid of this invention is preferably obtained by implementing the following first dispersion step and the subsequent second dispersion step.

(2) First Dispersion Step

In the first dispersion step, the substituted thiophene is dispersed as oil drops and an opaque dispersion is obtained by applying an ultrasonic process to the phase separation fluid obtained in the addition step. In the opaque dispersion, the oil drops of substituted thiophene with a diameter of several μm or less are dispersed in water in a high-dispersion state, but more than 10% of the total number of oil drops have a diameter of 250 nm or more. Therefore, the whole fluid seems opaque due to light scattering caused by the oil drops.

In this step, an ultrasonic oscillator such as one conventionally used in an ultrasonic washing machine or in a cell disintegrator can be used without any limitation. In this step, ultrasonic waves that can produce cavitations of several hundred nm to several μm with strong mechanical action are irradiated into the phase separation fluid. The frequency of ultrasonic waves is preferably within the range of 15 to 200 kHz, and more preferably, within the range of 20 to 100 kHz. The power of ultrasonic waves is preferably 4 W/cm$^2$ or more.

The ultrasonic irradiation period in this step is not subject to strict limitations as long as it is long enough to obtain an opaque dispersion, but the range of 2 to 10 minutes is preferable. As the irradiation period becomes longer, the aggregation of the oil drops of substituted thiophene is inhibited and the time period until demulsification tends to be prolonged. However, if the ultrasonic irradiation period is 10 minutes or more, the effect on the inhibition of the aggregation of oil drops tends to be saturated. The temperature of the phase separation fluid at the time of ultrasonic irradiation has no restriction as long as a composition change of the fluid does not occur and a stable opaque dispersion is obtained, but generally the temperature is preferably in the range of 10 to 60 degrees centigrade.

In the present invention, the first dispersion step can be implemented once, for example, once using ultrasonic waves at a frequency of 20 kHz with power of 10 W/cm$^2$, but it can also be implemented multiple times using ultrasonic waves at different frequencies and/or with different powers (for example, using ultrasonic waves at a frequency of 20 kHz with power of 10 W/cm$^2$ followed by ultrasonic waves at a frequency of 50 kHz with power of W/cm$^2$).

(3) Second Dispersion Step

Following the first dispersion step, by irradiating ultrasonic waves into the opaque dispersion at a frequency higher than that of the ultrasonic waves in the first dispersion step in order to decrease the mean size of the oil drops of substituted thiophene, a transparent dispersion, that is, a polymerization fluid in which 90% or more of the number of oil drops of substituted thiophene have a diameter of 250 nm or less, is obtained. The supporting electrolyte is used, and if it is not added to the phase separation fluid, it can be added to the opaque dispersion before the second dispersion step. However, if borodisalicylic acid and/or a borodisalicylic salt are used in this step, they should be used together with p-nitrophenol.

In this step, an ultrasonic oscillator such as one conventionally used in an ultrasonic washing machine or in a cell disintegrator can be used without any limitation. In this step, in order to decrease the size of the oil drops of substituted thiophene in the opaque dispersion to 250 nm or less, ultrasonic waves that have weak mechanical action but can generate at least the same size, or preferably the size of 100 nm or less, of cavitations, are used. The frequency of ultrasonic waves is preferably in the range of 1 to 4 MHz and the power of ultrasonic waves is preferably 5 W/cm$^2$ or more. If the frequency of the ultrasonic waves exceeds 4 MHz, cavitations are no longer generated.

The ultrasonic irradiation period in this step is not subject to strict limitations as long as it is long enough to obtain a transparent dispersion, but the range of 2 to 10 minutes is preferable. As the irradiation time becomes longer, the aggregation of the oil drops of substituted thiophene is inhibited and the time period until demulsification tends to be prolonged, but if the ultrasonic irradiation time is 10 minutes or more, the effect on the inhibition of the aggregation of oil drops tends to be saturated. The temperature of the opaque dispersion at the time of ultrasonic irradiation has no restriction as long as a composition change of the fluid does not occur and a stable transparent dispersion is obtained, but generally the temperature is preferably in the range of 10 to 60 degrees centigrade.

The second dispersion step can be implemented once, for example, once using ultrasonic waves at a frequency of 1 MHz with power of 20 W/cm$^2$, but it can also be implemented multiple times using ultrasonic waves at different frequencies and/or with different powers (for example, using ultrasonic waves at a frequency of 1 MHz with power of 20 W/cm$^2$ followed by ultrasonic waves at a frequency of 2 MHz with power of 10 W/cm$^2$), and it is preferable to implement this step more than once under the condition that the frequency of ultrasonic waves increases as the number of times the step is run increases. If the second dispersion step is repeated multiple times, the oil drops of substituted thiophene become more segmentalized, and a particularly preferable polymerization fluid in which 80% or more of the number of oil drops of substituted thiophene have a diameter of 100 nm or less can be obtained easily.

(4) Electropolymerization Step

In the present invention, electropolymerization is implemented by using the transparent dispersion obtained by the second dispersion step as a polymerization fluid. A supporting electrolyte is used, and in cases where it is not added to the phase separation fluid or the opaque dispersion, the supporting electrolyte can be added to the transparent dispersion before electropolymerization. If borodisalicylic acid and/or a borodisalicylic salt are used at this stage, they do not need to be used together with p-nitrophenol.

As a working electrode (a substrate of a conductive polymer film) introduced into the polymerization fluid, a substrate that has a conductive part at least on the surface is used. A plate, foil, net, sintered body, foam and so on of a conductive material such as platinum, nickel, titanium, steel and carbon can be used. Also, a transparent substrate with a deposited layer of a semiconducting ceramic such as tin-doped indium oxide (ITO), tin oxide, or fluorine-doped tin oxide on the surface of a transparent and insulated glass or plastic body can be used as the working electrode, and by using this working electrode, a transparent electrode with a conductive polymer film can be obtained. As an antipole, a plate of platinum, nickel and so on can be used. Moreover, it is preferable to use a polymerization fluid including EDOT as the substituted thiophene, because a PEDOT film that excels in permeability in respect of visible light (transparency) and has high conductivity and high electrochemical capacity can be obtained.

Electropolymerization is implemented by either one of the following methods: a potentiostatic method, a galvanostatic method, or a potential sweep technique. With the potentiostatic method, a potential of 1.0 to 1.5 V against the saturated calomel electrode is preferable. With the galvanostatic method, a current value of 1 to 10000 µA/cm$^2$ is preferable. With the potential sweep technique, a sweep within the range of 0 to 1.5 V against the saturated calomel electrode at a speed of 5 to 200 mV/s is preferable.

By electropolymerization, a conductive polymer film, preferably a PEDOT film, is formed on the substrate, preferably with the thickness of 0.001 to 50 µm. There is no strict restriction for the temperature of polymerization, but generally, it is within the range of 10 to 60 degrees centigrade. The polymerization time is generally within the range of 0.6 seconds to 10 hours. By electropolymerization, polymer particles of nearly the same size as minute oil drops are formed, and accordingly, a conductive polymer film in which seemingly transparent polymer particles are densely concentrated can be obtained.

To obtain a conductive polymer film, preferably a PEDOT film, with extremely high transparency, it is preferable that polymerization by a galvanostatic method is implemented at a current value of 5 to 500 µA/cm$^2$, preferably 10 to 100 µA/cm$^2$, for 0.6 to 120 seconds, preferably 6 to 60 seconds. By electropolymerization under this condition, a conductive polymer film, preferably a PEDOT film, with extremely high transparency and with a thickness of 0.001 to 0.05 µm, preferably 0.003 to 0.035 µm is obtained.

By cleaning with water, ethanol etc. and drying the conductive polymer film after electropolymerization, a conductive polymer film which is dense, has high conductivity and high electrochemical capacity, and is highly transparent can be obtained on the substrate. The conductive polymer film of the present invention has the property of excellent adherence to the substrate. Therefore, it can be used in a state where it is kept in place on the substrate. It can also be used as a conductive transparent film where it is detached from the substrate. The conductive polymer film of the present invention can be used for any electrical or optical usage where a conventional conductive polymer film is applied.

For example, where the conductive polymer film is kept in place on the substrate, a transparent electrode with high conductivity and high electrochemical capacity is obtained, and this transparent electrode can be preferably used as a component of various electronic devices including an organic electroluminescence device and a touch-screen display. Also, the conductive polymer film that is detached from the substrate as a conductive transparent film can be preferably used as a self-standing and flexible transparent electrode, and moreover, by attaching the highly transparent conductive polymer film to an insulated plastic tray or a plastic sheet, electrostatic charge can be prevented without altering the appearance of the device.

EXAMPLES

The examples of the present invention are shown as follows, but the present invention is not limited to the following examples.

(1) Stability of Oil Drops

To investigate the stability of the oil drops of substituted thiophene dispersed in water, the following experiments were carried out.

Experiment 1

50 mL of water was introduced into a glass container, 0.14 g of EDOT (strength: 0.02 M) was added to the solution, and a fluid in which EDOT was phase separated from water was obtained. In the first dispersion step, ultrasonic waves at a frequency of 20 kHz with power of 44 W/cm$^2$ were irradiated into this fluid for 5 minutes and an opaque dispersion was obtained. In the second dispersion step, ultrasonic waves at a frequency of 1.6 MHz with power of 16 W/cm$^2$ were irradiated into this opaque dispersion for 5 minutes to produce the first transparent dispersion, and then, ultrasonic waves at a frequency of 2.4 MHz with power of 7 W/cm$^2$ were irradiated for 5 minutes to produce a second transparent dispersion.

For each of the opaque dispersion, the first transparent dispersion and the second transparent dispersion, the size (diameter) of EDOT oil drops was measured by the dynamic light scattering method at 25° C., the zeta potential was measured by the electrophoretic light scattering method, and the pH was measured. The results are shown in Table 1. By implementing the second dispersion step following the first dispersion step, the mean size of the oil drops was significantly decreased, the pH was lowered, and the absolute value of the zeta potential increased. Moreover, when the second dispersion step was implemented twice by using ultrasonic waves with different frequencies and powers, the mean size of the oil drops further decreased, the pH further decreased, and the absolute value of the zeta potential further increased. If the absolute value of the zeta potential increases, the repulsion force of the oil drops becomes stronger, and therefore the stability of the oil drops increases. The results shown in Table 1 show that, by implementing the second dispersion step after the first dispersion step, a stable dispersion where the aggregation of oil drops is inhibited is obtained, and by implementing the second dispersion step twice, an even more stable dispersion where the aggregation of oil drops is further inhibited is obtained. It is assumed that the transparency of the polymerization fluid of the present invention can be maintained for a long time because of this increase in the absolute value of the zeta potential.

TABLE 1

| Irradiation Condition | Mean Size (nm) | Zeta Potential (mV) | pH |
|---|---|---|---|
| 20 kHz | 214 | −29 | 5.0 |
| 20 kHz→1.6 MHz | 76 | −37 | 4.2 |
| 20 kHz→1.6 MHz→2.4 MHz | 52 | −42 | 3.9 |

Experiment 2

The procedure in Experiment 1 was repeated by using 0.144 g of 3,4-dimethoxythiophene (strength: 0.02M) instead of 0.14 g of EDOT. The values of the mean size of the oil drops, the zeta potential, and pH that were measured for the opaque dispersion, the first transparent dispersion and the second transparent dispersion, are shown in Table 2. Table 2 shows that, in the dispersion in which 3,4-dimethoxythiophene is dispersed in water, in the same way as in the case of the dispersion in which EDOT is dispersed in water, by implementing the second dispersion step after the first dispersion step, a stable dispersion in which the aggregation of oil drops is inhibited is obtained, and by implementing the second dispersion step twice, a more stable dispersion in which the aggregation of oil drops is further inhibited is obtained,

TABLE 2

| Irradiation Condition | Mean Size (nm) | Zeta Potential (mV) | pH |
|---|---|---|---|
| 20 kHz | 243 | −29 | 5.2 |
| 20 kHz→1.6 MHz | 138 | −46 | 4.5 |
| 20 kHz→1.6 MHz→2.4 MHz | 55 | −48 | 4.1 |

(2) Preparation of Polymerization Fluid

Example 1

50 mL of lithium perchlorate aqueous solution with the strength of 1 M was introduced in a glass container, 0.14 g (strength: 0.02M) of EDOT was added to the solution, and a fluid in which EDOT and water were phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained. When irradiation of ultrasonic waves at a frequency of 1.6 MHz with power of 22 W/cm$^2$ for 5 minutes and subsequent irradiation of ultrasonic waves at a frequency of 2.4 MHz with power of 7.1 W/cm$^2$ for 5 minutes was applied to this opaque dispersion, a transparent dispersion was obtained. This fluid remained transparent after it was left for two days at normal temperatures.

Example 2

50 mL of lithium perchlorate aqueous solution with the strength of 1 M was introduced in a glass container, 0.14 g (strength: 0.02M) of EDOT was added to the solution, and a fluid in which EDOT and water are phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained. When irradiation of ultrasonic waves at a frequency of 1.6 MHz with power of 22 W/cm$^2$ was applied for 5 minutes, a transparent dispersion was obtained. This fluid remained transparent after it was left for two days at normal temperatures.

Example 3

50 mL of lithium perchlorate aqueous solution with the strength of 1 M was introduced in a glass container, 0.14 g (strength: 0.02M) of EDOT was added to the solution, and a fluid in which EDOT and water were phase-separated was obtained. When irradiation of ultrasonic waves at a frequency of 15 kHz with power of 22.6 W/cm$^2$ was applied for 5 minutes, an opaque dispersion in which EDOT was dispersed as oil drops in water was obtained. When irradiation of ultrasonic waves at a frequency of 2.4 MHz with power of 22 W/cm$^2$ was applied for 5 minutes, a transparent dispersion was obtained. This fluid remained transparent after it was left for two days at normal temperatures.

Example 4

50 mL of lithium perchlorate aqueous solution with the strength of 1 M was introduced in a glass container, 0.14 g (strength: 0.02M) of EDOT was added to the solution, and a fluid in which EDOT and water were phase-separated was obtained. When irradiation of ultrasonic waves at a frequency of 200 kHz with power of 50 W/cm$^2$ was applied for 30 minutes, an opaque dispersion in which EDOT was dispersed as oil drops in water was obtained. When irradiation of ultrasonic waves at a frequency of 2.4 MHz with power of 22 W/cm$^2$ was applied for 5 minutes, a transparent dispersion was obtained. This fluid remained transparent after it was left for two days at normal temperatures.

Example 5

50 mL of lithium perchlorate aqueous solution with the strength of 1 M was introduced in a glass container, 0.14 g (strength: 0.02M) of EDOT was added to the solution, and a fluid in which EDOT and water were phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained. When irradiation of ultrasonic waves at a frequency of 1.0 MHz with power of 22 W/cm$^2$ was applied for 5 minutes, a transparent dispersion was obtained. This fluid remained transparent after it was left for two days at normal temperatures.

Example 6

50 mL of lithium perchlorate aqueous solution with the strength of 1 M was introduced in a glass container, 0.14 g (strength: 0.02M) of EDOT was added to the solution, and a fluid in which EDOT and water are phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained. When irradiation of ultrasonic waves at a frequency of 4.0 MHz with power of 22 W/cm$^2$ was applied for 5 minutes, a transparent dispersion was obtained. This fluid remained transparent after it was left for two days at normal temperatures.

Comparative Example 1

50 mL of lithium perchlorate aqueous solution with the strength of 1 M was introduced in a glass container, 0.14 g (strength: 0.02M) of EDOT was added to the solution, and a fluid in which EDOT and water are phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained.

Comparative Example 2

50 mL of lithium perchlorate aqueous solution with the strength of 1 M was introduced in a glass container, 0.14 g (strength: 0.02 M) of EDOT was added to the solution, and a fluid in which EDOT and water are phase-separated was obtained. When irradiation of ultrasonic waves at a frequency of 10 kHz with power of 8 W/cm$^2$ was applied for 5 minutes, an opaque dispersion in which oil drops of EDOT was dispersed in a highly-dispersed state in water could not be obtained, and a part of the EDOT stayed at the bottom of the container. Irradiation of ultrasonic waves at a frequency of 2.4 MHz with power of 22 W/cm$^2$ was applied to this fluid for 5 minutes, and the dispersion obtained was opaque.

Comparative Example 3

50 mL of lithium perchlorate aqueous solution with the strength of 1 M was introduced in a glass container, 0.14 g (strength: 0.02 M) of EDOT was added to the solution, and a fluid in which EDOT and water are phase-separated was obtained. When irradiation of ultrasonic waves at a frequency of 250 kHz with power of 50 W/cm$^2$ was applied for 30 minutes, an opaque dispersion in which oil drops of EDOT was dispersed in a highly-dispersed state in water could not be obtained, and a part of the EDOT stayed at the bottom of the container. Irradiation of ultrasonic waves at a frequency of 2.4 MHz with power of 22 W/cm$^2$ was applied to this fluid for 5 minutes, and the dispersion obtained was opaque.

Comparative Example 4

50 mL of lithium perchlorate aqueous solution with the strength of 1 M was introduced in a glass container, 0.14 g (strength: 0.02 M) of EDOT was added to the solution, and a fluid in which EDOT and water were phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained. Irradiation of ultrasonic waves at a frequency of 800 kHz with power of 22 W/cm$^2$ was applied to this opaque dispersion for 5 minutes, and the dispersion obtained was opaque.

Comparative Example 5

50 mL of lithium perchlorate aqueous solution with the strength of 1M was introduced in a glass container, 0.14 g (strength: 0.02 M) of EDOT was added to the solution, and a fluid in which EDOT and water were phase-separated was obtained. When irradiation of ultrasonic waves at a frequency of 20 kHz with power of 22.6 W/cm$^2$ was applied for 5 minutes, an opaque dispersion in which EDOT was dispersed as oil drops in water was obtained. Irradiation of ultrasonic waves at a frequency of 5 MHz with power of 22 W/cm$^2$ was applied to this opaque dispersion for 5 minutes, and the dispersion obtained was opaque.

For the polymerization fluid in Example 1, Example 2, and Comparative Example 1, immediately after the ultrasonic irradiation, the size of EDOT oil drops was measured by the dynamic light scattering method at 25° C. FIG. 1 shows the distribution of the size of oil drops. Line 1 shows the measured result of the polymerization fluid in Example 1, Line 2 shows the measured result of the polymerization fluid in Example 2, and Line 3 shows the measured result of the polymerization fluid in Comparative Example 1 respectively. In all the polymerization fluids, the distribution of the size of the oil drops was narrow, and the mean size of EDOT oil drops was 79.2 nm in the polymerization fluid in Example 1, 187 nm in the polymerization fluid in Example 2, and 335 nm in the polymerization fluid in Comparative Example 1. In the polymerization fluid in Example 1, 99.6% of the total number of oil drops had a diameter of 250 nm or less, and 84.2% of the total number of oil drops had a diameter of 100 nm or less. In the polymerization fluid in Example 2, 95.7% of the total number of oil drops had a diameter of 250 nm or less, but there was no oil drop that had a diameter of 100 nm or less. On the other hand, in the polymerization fluid in Comparative Example 1, all of the oil drops had a diameter of more than 250 nm. Further, the procedure of Example 1 was repeated using 0.144 g of 3,4-dimethoxythiophene instead of 0.14 g of EDOT, and a dispersion that was as transparent as the polymerization fluid in Example 1 was obtained, and this fluid remained transparent after it was left for two days at normal temperatures.

(3) Electropolymerization 1

Measurement of Density and Conductivity

Example 7

A platinum electrode as a working electrode with an area of 2 cm by 2 cm, a platinum electrode as an antipole with an area of 4 cm by 4 cm, and a saturated calomel electrode as a reference electrode were introduced in the polymerization fluid in Example 1, and potentiostatic electropolymerization was implemented at 1.4 V. The conducting electric charge was restricted to 0.2 C/cm$^2$. The PEDOT film after polymerization was washed with ethanol and dried by leaving it for two hours at normal temperatures. For the PEDOT film obtained, the film thickness was measured by a step gauge, and estimated density was calculated by using the weight estimated from the conducting electric charge amount and the measurement of the film thickness. Furthermore, conductivity was measured by the four probe method. The values of film thickness, estimated density, and conductivity are shown in Table 3.

Example 8

Instead of the polymerization fluid in Example 1, the polymerization fluid in Example 2 was used and the procedure in Example 7 was repeated. The values of film thickness, estimated density and conductivity are shown in Table 3.

Comparative Example 6

Instead of the polymerization fluid in Example 1, the polymerization fluid in Comparative Example 1 was used and the procedure in Example 7 was repeated. The values of film thickness, estimated density and conductivity are shown in Table 3.

Comparative Example 7

Instead of the polymerization fluid in Example 1, a polymerization fluid, in which 0.14 g (strength: 0.02 M) of EDOT was dissolved in 50 mL of acetonitrile containing tetrabutylammonium perchlorate with the strength of 1M, was used and the procedure in Example 7 was repeated. The values of film thickness, estimated density and conductivity are shown in Table 3.

Comparative Example 8

Instead of the polymerization fluid in Example 1, a polymerization fluid, in which 0.14 g (strength: 0.02M) of EDOT was added to 50 mL of aqueous solution containing sodium dodecylbenzenesulfonate with the strength of 0.1M and to which irradiation of ultrasonic waves at a frequency of 20 kHz with power of 22.6 W/cm$^2$ for 5 minutes was applied, was used and the procedure in Example 7 was repeated. The values of film thickness, estimated density and conductivity are shown in Table 3.

Comparative Example 9

Instead of the polymerization fluid in Example 1, a polymerization fluid, in which 0.14 g (strength: 0.02M) of EDOT was added to 50 mL of aqueous solution containing sodium polystyrene sulfonate with the strength of 0.1M and to which irradiation of ultrasonic waves at a frequency of 20 kHz with power of 22.6 W/cm$^2$ for 5 minutes was applied, was used and the procedure in Example 7 was repeated. The values of film thickness, estimated density and conductivity are shown in Table 3.

TABLE 3

| | Film Thickness (μm) | Estimated Density (g/cc) | Conductivity (S/cm) |
|---|---|---|---|
| Example 7 | 2 | 1.47 | 313 |
| Example 8 | 3 | 0.98 | 119 |
| Comparative Example 6 | 5 | 0.59 | 33 |
| Comparative Example 7 | 3 | 0.98 | 278 |
| Comparative Example 8 | 4 | 0.75 | 1.2 |
| Comparative Example 9 | 3 | 0.99 | 3.6 |

As known from Table 3, the PEDOT films in Examples 7 and 8, in which the transparent dispersion was used in polymerization, have remarkably increased density and remarkably increased conductivity compared with the PEDOT film in Comparative Example 6, where the opaque dispersion was used for polymerization. A comparison between Example 7 and Example 8 shows that, by implementing the second dispersion step twice and making the size of EDOT oil drops in the transparent dispersion smaller, a more highly dense film is obtained which has greater conductivity. Especially, the PEDOT film in Example 7 using the polymerization fluid in which 84.2% of the EDOT oil drops had a diameter of 100 nm or less has remarkably high conductivity. Moreover, the PEDOT films in Examples 7 and 8, compared with the PEDOT films in Comparative Examples 8 and 9 using the aqueous polymerization fluid containing a conventional surfactant, have the same or more density, and have quite high conductivity.

The PEDOT films in Examples 7 and 8, compared with the PEDOT film in Comparative Example 7 using the conventional polymerization fluid in which acetonitrile was used as a solvent, have the same or more density, but as for conductivity, the PEDOT film in Example 8 has smaller value than that of the PEDOT film in Comparative Example 7. This seems to be because an oligomer (prepolymer) produced in the process of polymerization is dissolved into acetonitrile but not into water, extension of polymer chains in an aqueous medium is inhibited, and as a result, the degree of polymerization of PEDOT in Example 7 and 8 becomes lower than that of PEDOT in Comparative Example 7. Further, the procedure of Example 7 was repeated using a transparent dispersion containing 0.144 g of oil drops of 3,4-dimethoxythiophene, and a film of poly(3,4-dimethoxythiophene) having approximately the same conductivity as that in Example 7 was obtained.

(4) Electropolymerization 2

Thermal Stability of Conductivity

The thermal stability of the conductivity was evaluated by implementing thermal aging at 150 degrees centigrade for PEDOT films. In this case, when a substrate containing a lot of surface oxygen such as an ITO glass electrode is used as a substrate to layer a PEDOT film, the oxygen on the substrate moves to the PEDOT film in the process of thermal aging, and this oxygen possibly causes thermal deterioration of the PEDOT film. Therefore, on this occasion, a substrate with an epoxy resin layer which has little surface oxygen on the surface was used as a substrate on which the PEDOT film was layered.

Example 9

By applying epoxy resin to the surface of an aluminum foil that was cut into the project area in the form of a 1 by 1 cm$^2$ shape, a substrate with an insulation layer on the surface was obtained. This substrate was immersed in ethanol solution containing 20 mass percent of EDOT, and after being dried at a room temperature, it was then immersed in ethanol solution containing iron(III) p-toluenesulfonate as an oxidant with the strength of 20 mass percent. After being dried at a room temperature, it was given high-temperature treatment. By repeating this chemical oxidation polymerization, a chemical polymerization film of PEDOT was formed on the epoxy resin layer of the substrate.

The substrate with the above-mentioned chemical polymerization film as a working electrode, a platinum electrode with an area of 4 cm by 4 cm as an antipole, and a saturated calomel electrode as a reference electrode were introduced in the polymerization fluid in Example 1, and galvanostatic electropolymerization under the current condition of 0.5 mA/cm$^2$ was implemented. The conducting electric charge was restricted to 0.2 C/cm$^2$. After the obtained substrate with a composite layer of an electropolymerized film and a chemical polymerized film was cleaned with ethanol, it was dried by being left for 30 minutes at 160 degrees centigrade.

For the PEDOT composite later on the substrate, the conductivity was measured by the four probe method. Then, thermal aging at 150 degrees centigrade in the atmosphere was applied to the substrate with this composite layer, and its conductivity was measured after 100 hours, 200 hours and 300 hours. The results obtained are shown in Table 4.

Comparative Example 10

By applying epoxy resin to the surface of an aluminum foil that was cut into the project area in the form of a 1 by 1 cm$^2$ shape, a substrate with an insulated layer on the surface was obtained, and a chemical polymerization film of PEDOT was formed on the epoxy resin layer by the same process as in Example 9. The conductivity of the PEDOT chemical polymerization film on the substrate was measured by the four probe method. Then, thermal aging at 150 degrees centigrade in the atmosphere was applied to the substrate with the chemical polymerization film, and its conductivity was measured after 100 hours, 200 hours and 300 hours. The results obtained are shown in Table 4.

TABLE 4

| Aging Period (hr) | Example 9 Conductivity (S/cm) | Comparative Example 10 Conductivity (S/cm) |
|---|---|---|
| 0 | 40 | 8 |
| 100 | 24 | 0.5 |
| 200 | 7 | 0.02 |
| 300 | 3 | 0.001 |

The conductivity of the PEDOT chemical polymerization film in Comparative Example 10 rapidly decreased when the film experienced a high temperature of 150 degrees centigrade, and after the temperature of 150 degrees centigrade was experienced for 300 hours, the conductivity decreased to 1.25 by 10$^{-4}$ times of the initial value. On the other hand, the conductivity of the PEDOT composite layer in Example 9 after it experienced a temperature of 150 degrees centigrade for 300 hours was 7.5 by 10$^{-2}$ times of the initial value, which shows that the PEDOT film of the present invention has excellent thermal stability.

(5) Electropolymerization 3

Measurement of Electrical Capacity

Example 10

In the polymerization fluid of Example 1, a platinum rod electrode as a working electrode with a surface area of 0.06 cm$^2$, a platinum electrode with an area of 4 cm by 4 cm, and a silver-silver chloride electrode as a reference electrode were introduced, and galvanostatic electropolymerization was implemented for 60 seconds under the condition of 50 µA/cm$^2$. The conducting electric charge was 50 mC/cm$^2$. After polymerization, the working electrode was cleaned with water and ethanol, and it then was dried by being left at normal temperatures for 30 minutes. Then, the working electrode after drying was introduced to a sodium sulfate aqueous solution with the strength of 1M, and measurement of a cyclic voltammogram was implemented with a voltage range of 0 to 0.6V and a scan speed of 10 mV/second, and the electrochemical capacity of the PEDOT film was measured. The results are shown in Table 5.

Comparative Example 11

The polymerization fluid in Comparative Example 1 was used instead of the polymerization fluid in Example 1, and the procedure in Example 10 was repeated. The results are shown in Table 5.

Comparative Example 12

The polymerization fluid in Comparative Example 7 was used instead of the polymerization fluid in Example 1, and the procedure in Example 10 was repeated. The results are shown in Table 5.

Comparative Example 13

The polymerization fluid in Comparative Example 8 was used instead of the polymerization fluid in Example 1, and the procedure in Example 10 was repeated. The results are shown in Table 5.

TABLE 5

|  | Electrochemical Capacity (mC/cm$^2$) |
|---|---|
| Example 10 | 1.6 |
| Comparative Example 11 | 1.5 |
| Comparative Example 12 | 2 |
| Comparative Example 13 | 0.95 |

The PEDOT films obtained from aqueous polymerization fluid not including a surfactant of Example 10 and Comparative Example 11 have higher electrochemical capacity than that of the PEDOT film obtained from aqueous polymerization fluid containing a surfactant in Comparative Example 13, although it is lower than that of the PEDOT film using the polymerization fluid in Comparative Example 12 in which acetonitrile was used as a solvent. By comparing Example 10 and Comparative Example 11, it is found that the PEDOT film in which the transparent dispersion was used for polymerization has larger electrochemical capacity compared with the PEDOT film in which the opaque dispersion was used for polymerization.

(6) Electropolymerization 4

Absorbance and SEM Images of PEDOT Film

Example 11

In the polymerization fluid of Example 1, an ITO glass electrode as a working electrode with an area of 1 cm by 1 cm, a platinum electrode as an antipole with an area of 4 cm by 4 cm, and a saturated calomel electrode as a reference electrode were introduced, and potentiostatic electropolymerization was implemented at 1.4 V. The conducting electric charge was restricted to 0.2 C/cm$^2$. The PEDOT film after polymerization was washed with ethanol and dried by leaving it for two hours at normal temperatures. Then, for the ITO glass electrode with the PEDOT film after drying, absorbance was measured with a visible-ultraviolet spectrophotometer. Absorbance was also measured for the ITO glass electrode alone, and was left blank. Also, SEM images of the PEDOT film on the ITO glass electrode were taken at 1,000-fold magnification and at 5,000-fold magnification.

Example 12

The polymerization fluid in Example 2 was used instead of the polymerization fluid in Example 1, and the procedure in Example 11 was repeated.

Comparative Example 14

The polymerization fluid in Comparative Example 1 was used instead of the polymerization fluid in Example 1, and the procedure in Example 11 was repeated.

Comparative Example 15

The polymerization fluid in Comparative Example 7 was used instead of the polymerization fluid in Example 1, and the procedure in Example 11 was repeated.

Figure 2:
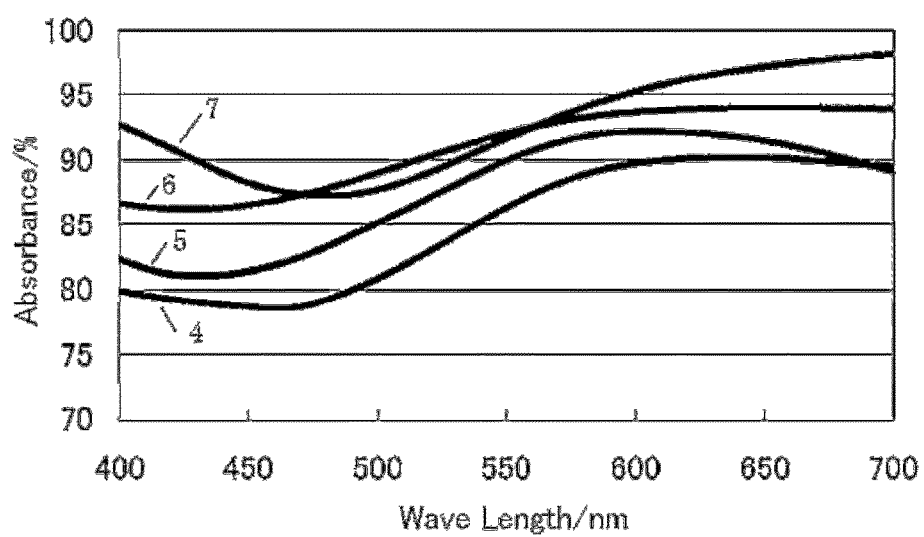
FIG. 2 shows the measured results of absorbance of PEDOT films formed on a substrate.

FIG. 2 shows absorbance in the visible-ultraviolet region for the ITO glass electrodes with the PEDOT film in Examples 11 and 12, as well as Comparative Examples 14 and 15. Line 4 shows the result for Example 11, Line 5 shows the result for Example 12, Line 6 shows the result for Comparative Example 14, and Line 7 shows the result for Comparative Example 15. It is shown that the PEDOT films in Examples 11 and 12 have lower absorbance than that of the PEDOT films in Comparative Examples 14 and 15, and therefore the formers have excellent transparency. By comparing Example 11 and Example 12, it is found that, by implementing the second dispersion step twice and making the size of the EDOT oil drops in the transparent dispersion smaller, the transparency of the film increases.

The PEDOT films in Examples 11, 12 and Comparative Example 14, in which the aqueous polymerization fluid not containing a surfactant was used, have an absorption peak on the shorter wavelength side compared with the PEDOT film of Comparative Example 15 using the polymerization fluid in which conventional acetonitrile was used as solvent. This seems to be because, as mentioned above, an oligomer (pre-polymer) produced in the process of polymerization is dissolved into acetonitrile but not into water, extension of polymer chains in an aqueous medium is inhibited, and as a result, the degree of polymerization of PEDOT in Examples 11 and 12, and Comparative Example 14 become lower than that of PEDOT in Comparative Example 15.

Figure 3:
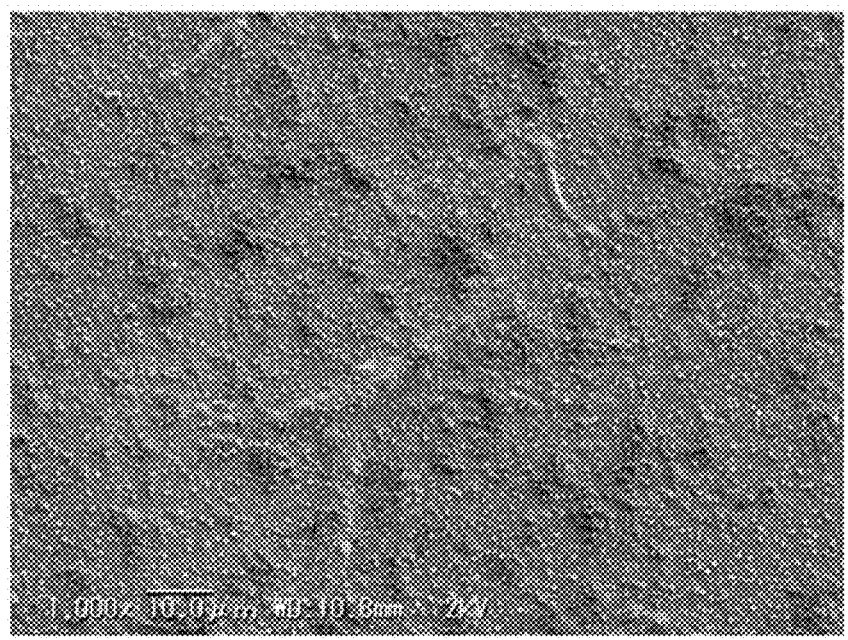
FIG. 3 shows SEM images of a PEDOT film in which a transparent dispersion is used for polymerization, in which a) is an image at 1,000-fold magnification and b) is an image at 5,000-fold magnification.
Figure 3:
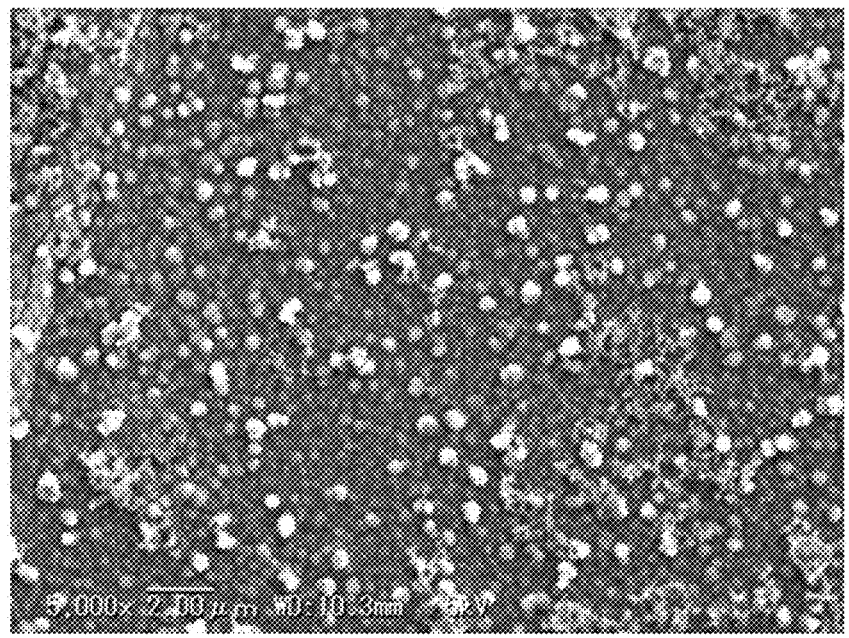
Figure 4:
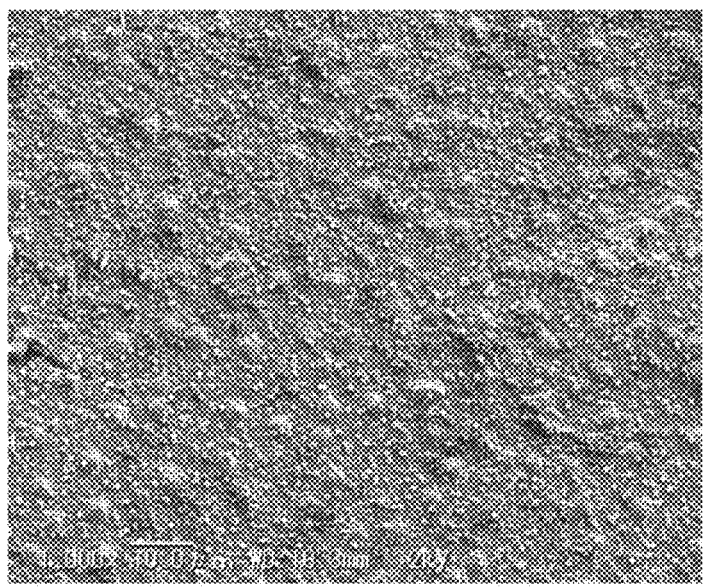
FIG. 4 shows SEM images of a PEDOT film in which an opaque dispersion is used for polymerization, in which a) is an image at 1,000-fold magnification and b) is an image at 5,000-fold magnification.
Figure 4:
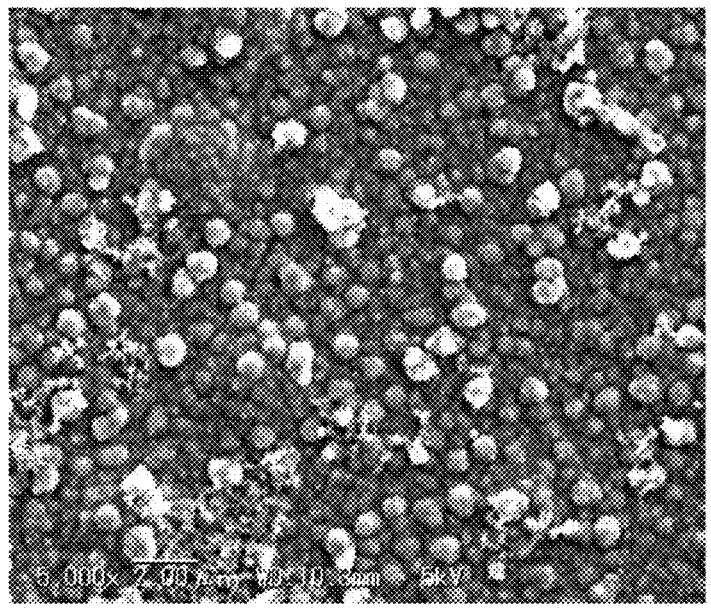
Figure 5:
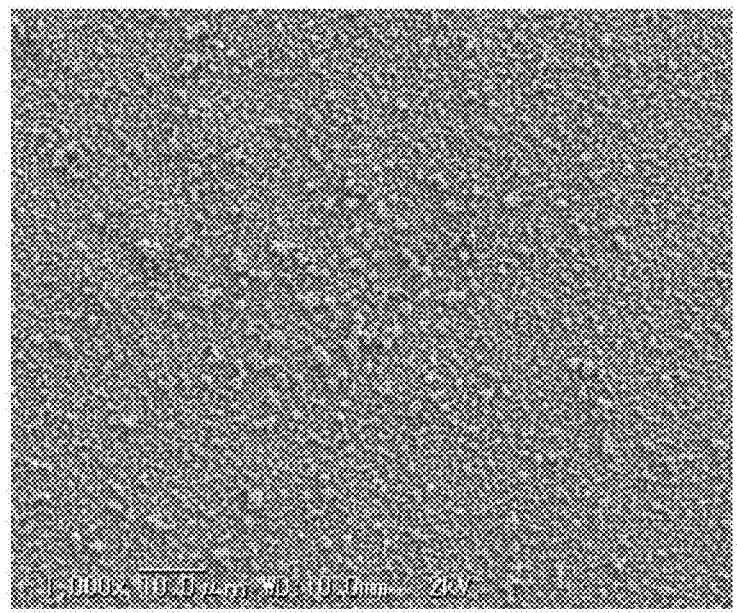
FIG. 5 shows SEM images of a PEDOT film obtained from a polymerization fluid including acetonitrile as a solvent, in which a) is an image at 1,000-fold magnification and b) is an image at 5,000-fold magnification.
Figure 5:
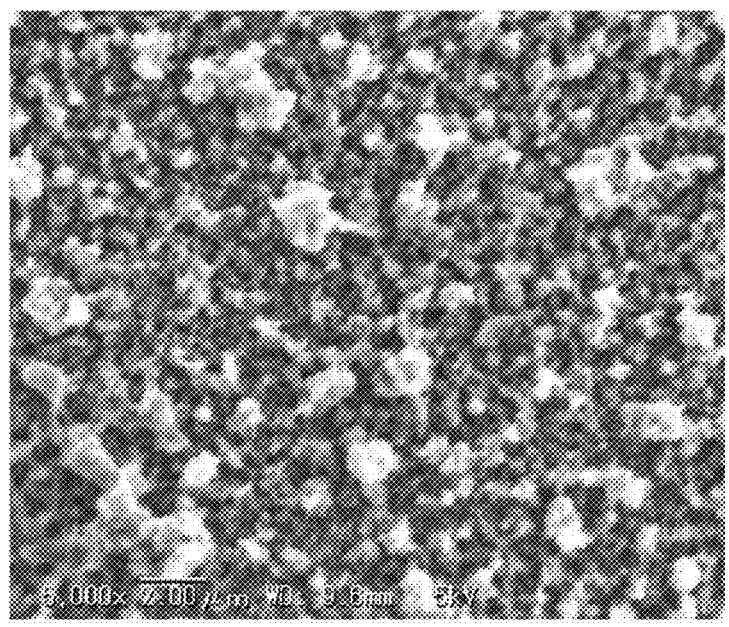

FIG. 3 shows SEM images of the PEDOT film in Example 11, FIG. 4 shows SEM images of the PEDOT film in Comparative example 14, and FIG. 5 shows SEM images of the PEDOT film in Comparative Example 15. In each figure, a) is an image at 1,000-fold magnification and b) is an image at 5,000-fold magnification.

From FIGS. 3 and 4, it is found that the PEDOT films in which spherical particles are densely filled are obtained from the aqueous polymerization fluid not containing a surfactant. Moreover, as the size of the monomer oil drops in the polymerization fluid is smaller, the particle size of PEDOT becomes smaller, and the size of the monomer oil drops in the polymerization fluid and the particle size of PEDOT are approximately the same. The film which is composed of densely packed particles is obtained in the present invention, and this appears to be responsible for realizing the high conductivity, the high electrochemical capacity and the high transparency of the film.

From the SEM images of the PEDOT film obtained from the polymerization fluid in which acetonitrile was used as a solvent, it is observed that some of the PEDOT particles are dissolved into acetonitrile. This seems to be the reason for the reduced transparency of this PEDOT film. Further, the procedure of Example 11 was repeated using a transparent dispersion containing oil drops of 0.144 g of 3,4-dimethoxythiophene, and absorbance was measured using a visible-ultraviolet spectrophotometer for an ITO glass electrode with a film of poly(3,4-dimethoxythiophene). Then, it was found that the conductive polymer film showed approximately the same absorbance as in Example 11.

(7) Electropolymerization 5

Light Transmittance of Self-Standing PEDOT Film

Example 13

In the polymerization fluid of Example 1, an ITO glass electrode as a working electrode with an area of 1 cm by 3 cm, a platinum electrode as an antipole with an area of 2 cm by 2 cm, and a saturated calomel electrode as a reference electrode were introduced, and potentiostatic electropolymerization was implemented at 1.4 V. The conducting electric charge was restricted to 0.05 C/cm$^2$. The PEDOT film after polymerization was cleaned with acetonitrile and was then dried under reduced pressure. Then, the PEDOT film was detached from the ITO glass electrode, and light transmittance of the self-standing film obtained was measured with a visible-ultraviolet spectrophotometer.

Comparative Example 16

The polymerization fluid in Comparative Example 1 was used instead of the polymerization fluid in Example 1, and the procedure in Example 13 was repeated.

Comparative Example 17

The polymerization fluid in Comparative Example 7 was used instead of the polymerization fluid in Example 1, and the procedure in Example 13 was repeated.

Figure 6:
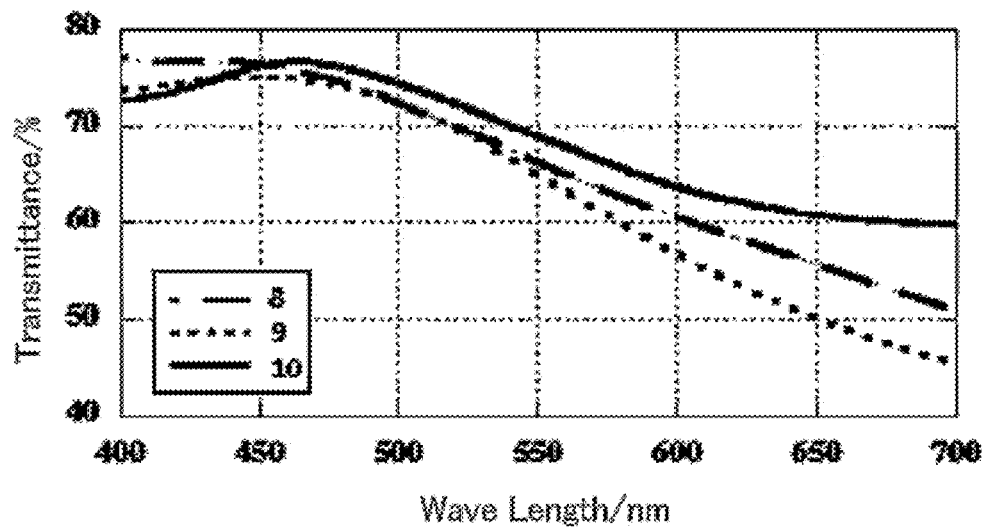
FIG. 6 shows the light transmittance of PEDOT films detached from a substrate.

FIG. 6 shows transmittance in the visible-ultraviolet region for the self-standing PEDOT films in Example 13 and Comparative Examples 16 and 17. Line 8 shows the result for Comparative Example 17, Line 9 shows the result for Comparative Example 16, and Line shows the result for Example 13. The results show that the PEDOT film in Example 13 has higher light transmittance than that of the PEDOT films in Comparative Examples 16 and 17, and therefore the former has higher transparency. Since the PEDOT film in Example 13 is mainly composed of PEDOT particles of 100 nm or less, visible light does not scatter and is easily transmissible.

(8) Electropolymerization 6

Thermal Stability of Transparent Glass Electrode with PEDOT Conductive Film

Example 14

50 mL of distilled water was introduced in a glass container, 0.140 g (strength: 0.02 M) of EDOT was added to the solution, and a fluid in which EDOT and water are phase-separated was obtained. Irradiation of ultrasonic waves at a frequency of 20 kHz with power of 22.6 W/cm$^2$ was applied to this fluid for 5 minutes, and an opaque dispersion in which EDOT was dispersed as oil drops in water was obtained. Irradiation of ultrasonic waves at a frequency of 1.6 MHz with power of 22 W/cm$^2$ for 5 minutes and subsequent irradiation of ultrasonic waves at a frequency of 2.4 MHz with power of 7.1 W/cm$^2$ for 5 minutes were given to the opaque dispersion, and a transparent dispersion was obtained. This fluid remained transparent even after it was left for two days at normal temperatures. Ammonium borodisalicylate was dissolved into this dispersion at the strength of 0.08 M to obtain a polymerization fluid.

An ITO electrode as a working electrode with an area of 1 cm$^2$, a platinum mesh with an area of 4 cm$^2$ as an antipole, and a silver-silver chloride electrode as a reference electrode were introduced into the polymerization fluid obtained, and galvanostatic electropolymerization was implemented for 60 seconds under the condition of 10 μA/cm$^2$. The working electrode after polymerization was cleaned with methanol and dried for 30 minutes at 150 degrees centigrade, and a transparent glass electrode with PEDOT conductive film was obtained.

Example 15

50 mL of distilled water was introduced into a glass container, 0.210 g (strength: 0.03 M) of EDOT was added to the solution, and a fluid in which EDOT and water are phase-separated was obtained. Irradiation of ultrasonic waves at a frequency of 20 kHz with power of 22.6 W/cm$^2$ was applied to this fluid for 5 minutes, and an opaque dispersion in which EDOT was dispersed as oil drops in water was obtained. Irradiation of ultrasonic waves at a frequency of 1.6 MHz with power of 22 W/cm$^2$ for 5 minutes and subsequent irradiation of ultrasonic waves at a frequency of 2.4 MHz with power of 7.1 W/cm$^2$ for 5 minutes were given to the opaque dispersion, and a transparent dispersion was obtained. Then, sodium bis(pentafluoroethanesulfonyl)imide was dissolved into this fluid at the strength of 0.08 M to obtain a polymerization fluid.

An ITO electrode as a working electrode with an area of 1 cm$^2$, a platinum mesh with an area of 4 cm$^2$ as an antipole, and a silver-silver chloride electrode as a reference electrode were introduced into the polymerization fluid obtained, and galvanostatic electropolymerization was implemented for 60 seconds under the condition of 10 μA/cm. The working electrode after polymerization was cleaned with methanol and dried for 30 minutes at 150 degrees centigrade, and a transparent glass electrode with PEDOT conductive film was obtained.

For the supporting electrolytes used in the polymerization fluids of Examples 14 and 15, it was initially checked with the following method whether they could act as a surfactant. EDOT and the supporting electrolytes in the amount used in each Example were added to water, were mechanically agitated, and left still. It was confirmed that water and EDOT are phase-separated rapidly and that these supporting electrolytes do not act as a surfactant.

Comparative Example 18

50 mL of distilled water was introduced to the glass container, 0.14 g (strength: 0.02 M) of EDOT, 1.08 g (strength: 0.08 M) of sodium butylnaphthalenesulfonate as a surfactant with a sulfonic salt group were added to the solution. After the fluid was agitated for 60 minutes at 25 degrees centigrade, a polymerization fluid was obtained. An ITO electrode as a working electrode with an area of 1 cm$^2$, a platinum mesh with an area of 4 cm$^2$ as an antipole, and a silver-silver chloride electrode as a reference electrode were introduced into the polymerization fluid obtained, and galvanostatic electropolymerization was implemented for 60 seconds under the condition of 10 μA/cm2. The working electrode after polymerization was cleaned with methanol and dried for 30 minutes at 150 degrees centigrade, and a transparent glass electrode with PEDOT conductive film was obtained.

Comparative Example 19

On an ITO electrode with an area of 1 cm$^2$, 100 μL of a commercially available dispersion fluid containing a complex of PEDOT and polystyrene sulfonic acid (PSS) (trade name: Baytron P, manufacturer: H. C. Starck) was cast, and spin coating was implemented for 30 seconds at a rotational speed of 5,000 rpm. Then, it was dried for 30 minutes at 150 degrees centigrade and a transparent glass electrode with PEDOT conductive film was obtained.

The electrochemical activity of the transparent glass electrodes with PEDOT conductive film in Examples 14 and 15 as well as Comparative Examples 18 and 19 was evaluated by cyclic voltammogram. As an electrolytic solution, sodium sulfate was dissolved in water at the strength of 1M. The transparent glass electrode with PEDOT conductive film as a working electrode for each of Examples 14 and 15 as well as Comparative Examples 18 and 19, a platinum mesh as an antipole with an area of 4 cm$^2$, and a silver-silver chloride electrode as a reference electrode were introduced to the electrolytic solution. Each electrode was evaluated with a scanning potential range of −0.5 to +0.5 V and a scanning velocity 10 mV/s. Then, the transparent glass electrode with PEDOT conductive film was removed from the electrolytic solution, was cleaned, and then given thermal aging treatment at 150 degrees centigrade for 330 hours, and electrochemical activity was evaluated again by cyclic voltammogram.

Figure 7:
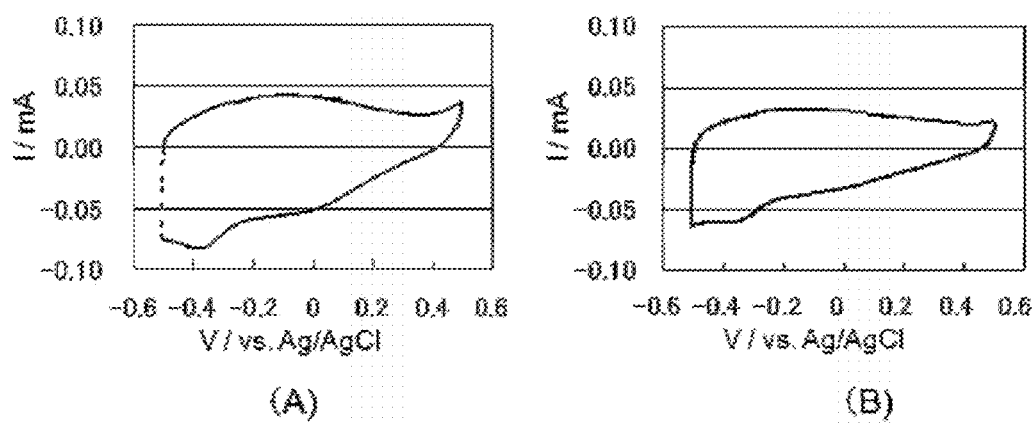
FIG. 7 shows cyclic voltammograms of a transparent electrode of an example of the present invention, in which (A) shows the result of early measurement and (B) shows the measured result after a high temperature is experienced.
Figure 8:
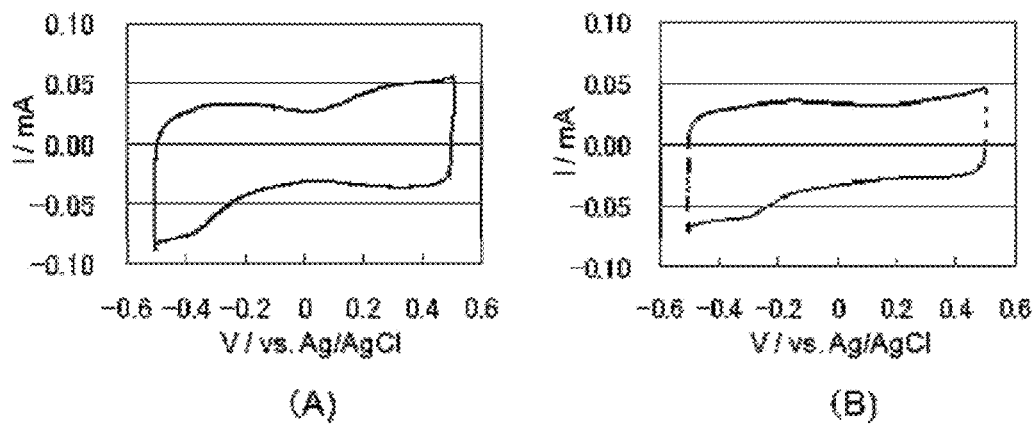
FIG. 8 shows cyclic voltammograms of a transparent electrode of another example of the present invention, in which (A) shows the result of early measurement and (B) shows the measured result after a high temperature is experienced.
Figure 9:
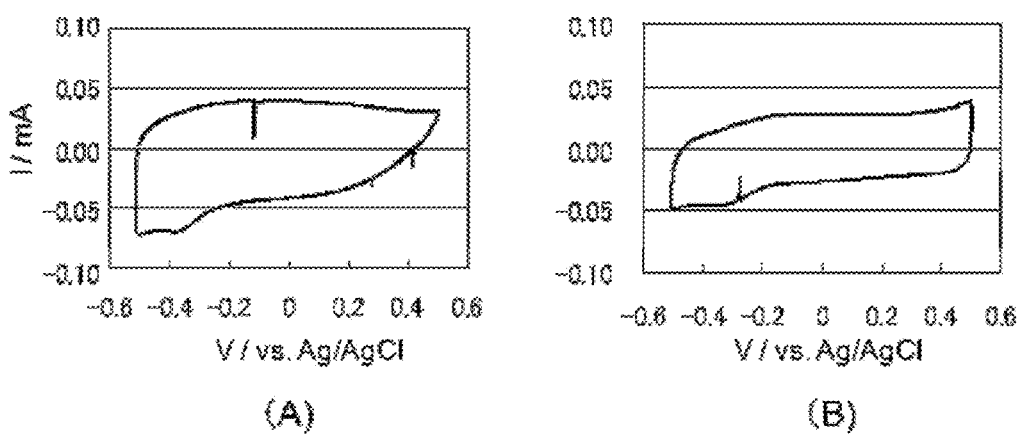
FIG. 9 shows cyclic voltammograms of a transparent electrode obtained from a polymerization fluid including a surfactant, in which (A) shows the result of early measurement and (B) shows the measured result after a high temperature is experienced.
Figure 10:
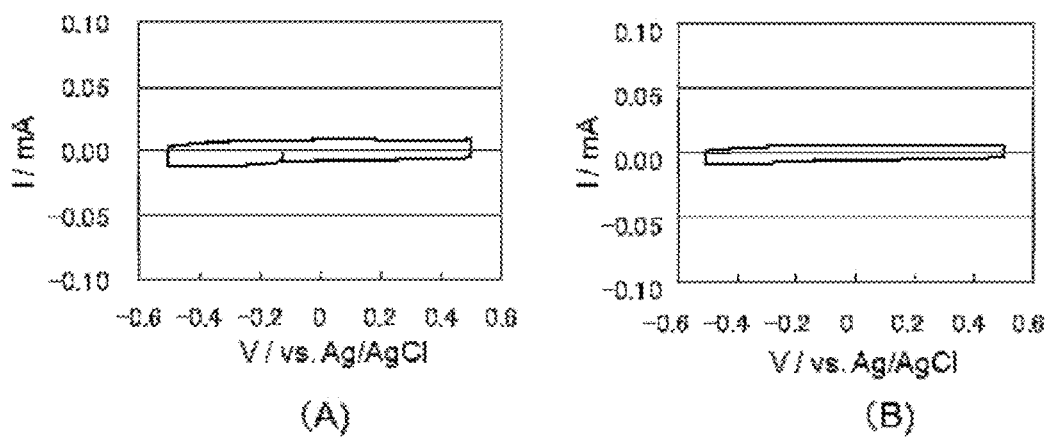
FIG. 10 shows cyclic voltammograms of a transparent electrode obtained from a slurry including a surfactant, in which (A) shows the result of early measurement and (B) shows the measured result after a high temperature is experienced.

FIGS. 7 to 10 show the cyclic voltammograms before and after the thermal aging. FIG. 7 shows the cyclic voltammograms of the transparent glass electrode with PEDOT conductive film in Example 14 (using sodium borodisalicylate), FIG. 8 shows the cyclic voltammograms of the transparent glass electrode with PEDOT conductive film in Example 15 (using sodium bis(pentafluoroethanesulfonyl)imide), FIG. 9 shows the cyclic voltammograms of the transparent glass electrode with PEDOT conductive film in Comparative Example 18 (using sodium butylnaphthalenesulfonate), and FIG. 10 shows the cyclic voltammograms of the transparent glass electrode with PEDOT conductive film in Comparative Example 19 (using sodium polystyrene sulfonate). In each figure, (A) is the initial cyclic voltammogram and (B) is the cyclic voltammogram after the thermal aging.

By reference to the initial cyclic voltammograms, it is found that the transparent glass electrode with PEDOT conductive film in Comparative Example 19 has a remarkably smaller current response compared with the other conductive films, and has poor electrochemical activity. By reference to the cyclic voltammograms before and after the thermal aging, it is found that the transparent glass electrodes with PEDOT conductive film in Examples 14 and 15 have remarkably smaller current-response decrease as a result of thermal experience compared with the transparent glass electrodes with PEDOT conductive film in Comparative examples 18 and 19. Therefore, it is found that the transparent glass electrodes with PEDOT conductive film in the present invention have excellent electrochemical activity and also have excellent thermal resistance.

Conventionally, an anionic surfactant with a sulfonic salt group or a sulfonic acid group has frequently been used as a supporting electrolyte to increase the aqueous concentration of EDOT with low water solubility, and it has been reported that a PEDOT film in which an anion of the surfactant is doped has excellent thermal durability because de-doping is inhibited by the bulkiness of the dopant (see patent literature 2). However, the conductive films in Examples 14 and 15 shows much better thermal resistance than the conductive films in Comparative example 18 (dopant: butylnaphthalenesulphonic ion) and Comparative example 19 (dopant: polystyrene sulfonic ion). Especially, the conductive film of Example 15 obtained from the polymerization fluid containing sodium bis(pentafluoroethanesulfonyl)imide shows remarkably excellent thermal stability.

INDUSTRIAL APPLICABILITY

A transparent film such as a PEDOT film obtained from a polymerization fluid of the present invention has high transparency and high conductivity, and can be used preferably for a transparent electrode and an antistatic film, and is suitable for various electric and chemical applications such as an organic electro-luminescence device.

EXPLANATION OF REFERENCE SIGNS

1 Polymerization fluid dispersed at 20 kHz+1.6 MHz+2.4 MHz
2 Polymerization fluid dispersed at 20 kHz+1.6 MHz
3 Polymerization fluid dispersed at 20 kHz
4 Polymerization fluid dispersed at 20 kHz+1.6 MHz+2.4 MHz
5 Polymerization fluid dispersed at 20 kHz+1.6 MHz
6 Polymerization fluid dispersed at 20 kHz
7 Polymerization fluid of EDOT/acetonitrile
8 Polymerization fluid of EDOT/acetonitrile
9 Polymerization fluid dispersed at 20 kHz
10 Polymerization fluid dispersed at 20 kHz+1.6 MHz+2.4 MHz

What is claimed is:

1. A polymerization fluid for electropolymerization of at least one monomer selected from the group consisting of 3,4-disubstituted thiophenes, the monomer being dispersed as oil drops in surfactant-free water, and the polymerization fluid being transparent, wherein 90% or more of the total number of oil drops of the monomer dispersed in the polymerization fluid have a diameter of 250 nm or less.

2. The polymerization fluid according to claim 1, wherein the monomer is 3,4-ethylenedioxythiophene.

3. The polymerization fluid according to claim 1, further comprising at least one supporting electrolyte.

4. The polymerization fluid according to claim 3, wherein the supporting electrolyte is at least one compound selected from a group consisting of borodisalicylic acid and borodisalicylic salts.

5. The polymerization fluid according to claim 3, wherein the supporting electrolyte is at least one compound selected from the group consisting of a sulfonylimidic acid of the formula (I) or the formula (II)

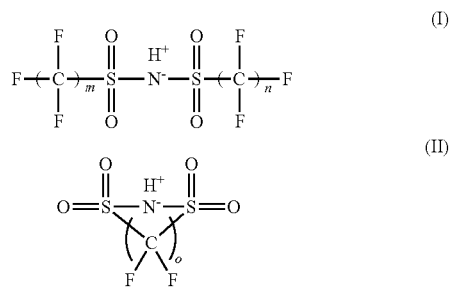

where m is an integer from 1 to 4, n is an integer from 1 to 4, and o is an integer 2 or 3, and salts thereof.

6. A method for producing the polymerization fluid according to claim 1, comprising:
an addition step of adding the monomer to the surfactant-free water to prepare a phase separation fluid where water and the monomer are phase-separated;
a first dispersion step of irradiating the phase separation fluid with ultrasonic waves to make the monomer dispersed in the form of oil drops and thus prepare an opaque dispersion, and
a second dispersion step of irradiating the opaque dispersion with ultrasonic waves having a frequency higher than that of the ultrasonic waves used in the first dispersion step to reduce the mean size of the oil drops of the monomer and thus prepare a transparent dispersion.

7. A method for producing the polymerization fluid according to claim 3, comprising:
an addition step of adding the monomer to the surfactant-free water to prepare a phase separation fluid where water and the monomer are phase-separated;
a first dispersion step of irradiating the phase separation fluid with ultrasonic waves to make the monomer dispersed in the form of oil drops and thus prepare an opaque dispersion;
a second dispersion step of irradiating the opaque dispersion with ultrasonic waves having a frequency higher than that of the ultrasonic waves used in the first dispersion step to reduce the mean size of the oil drops of the monomer and thus prepare a transparent dispersion, and
a step of adding the at least one supporting electrolyte, before the first dispersion step, between the first dispersion step and the second dispersion step, or after the second dispersion step.

8. The method for producing the polymerization fluid according to claim 6, wherein the ultrasonic waves in the first dispersion step have a frequency within the range of 15 to 200 kHz and power of 4 W/cm² or more, and the ultrasonic waves in the second dispersion step have a frequency within the range of 1 to 4 MHz and power of 5 W/cm² or more.

9. The method for producing the polymerization fluid according to claim 6, wherein the ultrasonic irradiation period in the first dispersion step is within the range of 2 to 10 minutes and the ultrasonic irradiation period in the second dispersion step is within the range of 2 to 10 minutes.

10. The method for producing the polymerization fluid according to claim 7, wherein the ultrasonic waves in the first dispersion step have a frequency within the range of 15 to 200 kHz and a power of 4 W/cm² or more, and the ultrasonic waves in the second dispersion step have a frequency within the range of 1 to 4 MHz and a power of 5 W/cm² or more.

11. The method for producing the polymerization fluid according to claim 7, wherein the ultrasonic irradiation period in the first dispersion step is within the range of 2 to 10 minutes and the ultrasonic irradiation period in the second dispersion step is within the range of 2 to 10 minutes.

* * * * *